US009893529B1

(12) United States Patent
Miao

(10) Patent No.: US 9,893,529 B1
(45) Date of Patent: Feb. 13, 2018

(54) COUPLING DYNAMICS FOR POWER SYSTEMS WITH ITERATIVE DISCRETE DECISION MAKING ARCHITECTURES

(71) Applicant: Zhixin Miao, Tampa, FL (US)

(72) Inventor: Zhixin Miao, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 15/196,961

(22) Filed: Jun. 29, 2016

Related U.S. Application Data

(60) Provisional application No. 62/244,304, filed on Oct. 21, 2015.

(51) Int. Cl.
*H02J 3/38* (2006.01)
(52) U.S. Cl.
CPC .................... *H02J 3/381* (2013.01)
(58) Field of Classification Search
CPC .. G05D 3/12; G05D 5/00; G05D 9/00; G05D 11/00; G05D 17/00; G05F 1/66; G06F 17/00; G07F 19/00; G06Q 10/00; G08B 23/00
USPC ........ 307/43, 52, 57, 59, 72, 73, 76, 80, 84, 307/153; 700/286, 295; 705/34, 412
See application file for complete search history.

(56) References Cited

U.S. PATENT DOCUMENTS 6,272,483 B1    8/2001  Joslin
8,204,836 B2    6/2012  Balaban et al.
8,588,991 B1 *  11/2013  Forbes, Jr. ............. G05B 19/02
                                         700/286
8,792,217 B2 *  7/2014  Shah ...................... H02H 7/261
                                         361/20
2006/0200333 A1   9/2006  Dalal
2012/0029720 A1   2/2012  Cherian et al.
2015/0081129 A1   3/2015  Xu et al.

OTHER PUBLICATIONS

W. Zhang, W. Liu, X. Wang, L Liu, and F. Ferrese, "Online optimal generation control based on constrained distributed gradient algorithm," Power Systems, IEEE Transactions on, vol. 30, No. 1, pp. 35-45, Jan. 2014.

(Continued)

*Primary Examiner* — Thienvu Tran
*Assistant Examiner* — David M Stables
(74) *Attorney, Agent, or Firm* — Thomas|Horstemeyer, LLP.

(57) ABSTRACT

Various examples are provided that are related to coupling dynamics for, e.g., power systems with iterative discrete decision making architectures. In one example, a method includes determining an output power adjustment using a frequency difference associated with a generator of a first area of a power system and price signals corresponding to power generation in the first area and in a second area coupled to the first area by a tie-line; and providing a power command based upon the output power adjustment to a control system of the generator. In another example, a power system control system includes first and second agents configured to control power generation of a first area and a second area of a power system, respectively. The second agent can control power generation of the second area using frequency differences of generators in the second area and price signals of the first and second areas.

20 Claims, 10 Drawing Sheets

(56) References Cited

OTHER PUBLICATIONS

V. R. Disfani, L. Fan, L. Piyasinghe, and Z. Miao, "Multi-agent control of community and utility using lagrangian relaxation based dual decomposition," Electric Power Systems Research, vol. 110, pp. 45-54, 2014.

V. R. Disfani, Z. Miao, L Fan, and B. Zeng, "Dual decomposition based privacy-preserving multi-horizon utility-community decision making paradigms," http://arxiv.org/abs/1503.09087, Mar. 2015.

Z. Miao and L. Fan, "A Novel Multi-Agent Decision Making Architecture Based on Dual's Dual Problem Formulation," accepted, IEEE trans. Smart Grid, Jun. 2016.

Y. Xu, W. Zhang, W. Liu, X. Wang, E Ferrese, C. Zang, and H. Yu, "Distributed subgradient-based coordination of multiple renewable generators in a microgrid," Power Systems, IEEE Transactions on, vol. 29, No. 1, pp. 23-33, 2014.

F. L. Alvarado, J. Meng, C. L. DeMarco, and W. S. Mota, "Stability analysis of interconnected power systems coupled with market dynamics," IEEE Trans. Power Syst., vol. 16, No. 4, pp. 695-701, 2001.

C. Zhao, U. Topcu, N. Li, and S. Low, "Design and stability of load-side primary frequency control in power systems," Automatic Control, IEEE Transactions on, vol. 59, No. 5, pp. 1177-1189, 2014.

Z. Miao and L Fan, "Achieving economic operation and secondary frequency regulation simultaneously through feedback control," 2015.

L. Chen and K. Aihara, "Stability and bifurcation analysis of differential difference-algebraic equations," Circuits and Systems I: Fundamental Theory and Applications, IEEE Transactions on, vol. 48, No. 3, pp. 308-326, 2001.

Venkateswaran, J., and Y-J. Son. "Hybrid system dynamic—discrete event simulation-based architecture for hierarchical production planning." International Journal of Production Research 43.20 (2005): 4397-4429.

Keane, Michael P., and Kenneth I. Wolpin. "The solution and estimation of discrete choice dynamic programming models by simulation and interpolation: Monte Carlo evidence." The Review of Economics and Statistics (1994): 648-672.

Parallel and distributed computation by D. P. Bertsekas and J. N. Tsitsiklis, Sections 3.3 and 3.4, pp. 210-264. Prentice Hall Inc., Old Tappan, NJ (USA), 1989. Accessible at https://dspace.mit.edu/handle/1721.1/3719#files-area.

* cited by examiner

US 9,893,529 B1

COUPLING DYNAMICS FOR POWER SYSTEMS WITH ITERATIVE DISCRETE DECISION MAKING ARCHITECTURES

CROSS REFERENCE TO RELATED APPLICATIONS

This application claims priority to, and the benefit of, U.S. provisional application entitled "ANALYSIS OF COUPLING DYNAMICS FOR POWER SYSTEMS WITH ITERATIVE DISCRETE DECISION MAKING ARCHITECTURES" having Ser. No. 62/244,304, filed Oct. 21, 2015, which is hereby incorporated by reference in its entirety.

BACKGROUND

Introduction of numerous smart buildings, distributed energy sources and energy storages poses challenges in operation and control. A centralized control center may over burden its SCADA system and computing machines to collect every piece of measurements and calibrate optimal operation schemes. This may result from the large amount of data being communicated from the utility grid in addition to retail and residential users. On the other hand, due to privacy concerns, communities are not willing to share all information even though all data is assumed to be available. These conditions can complicate the operation of the centralized control center.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
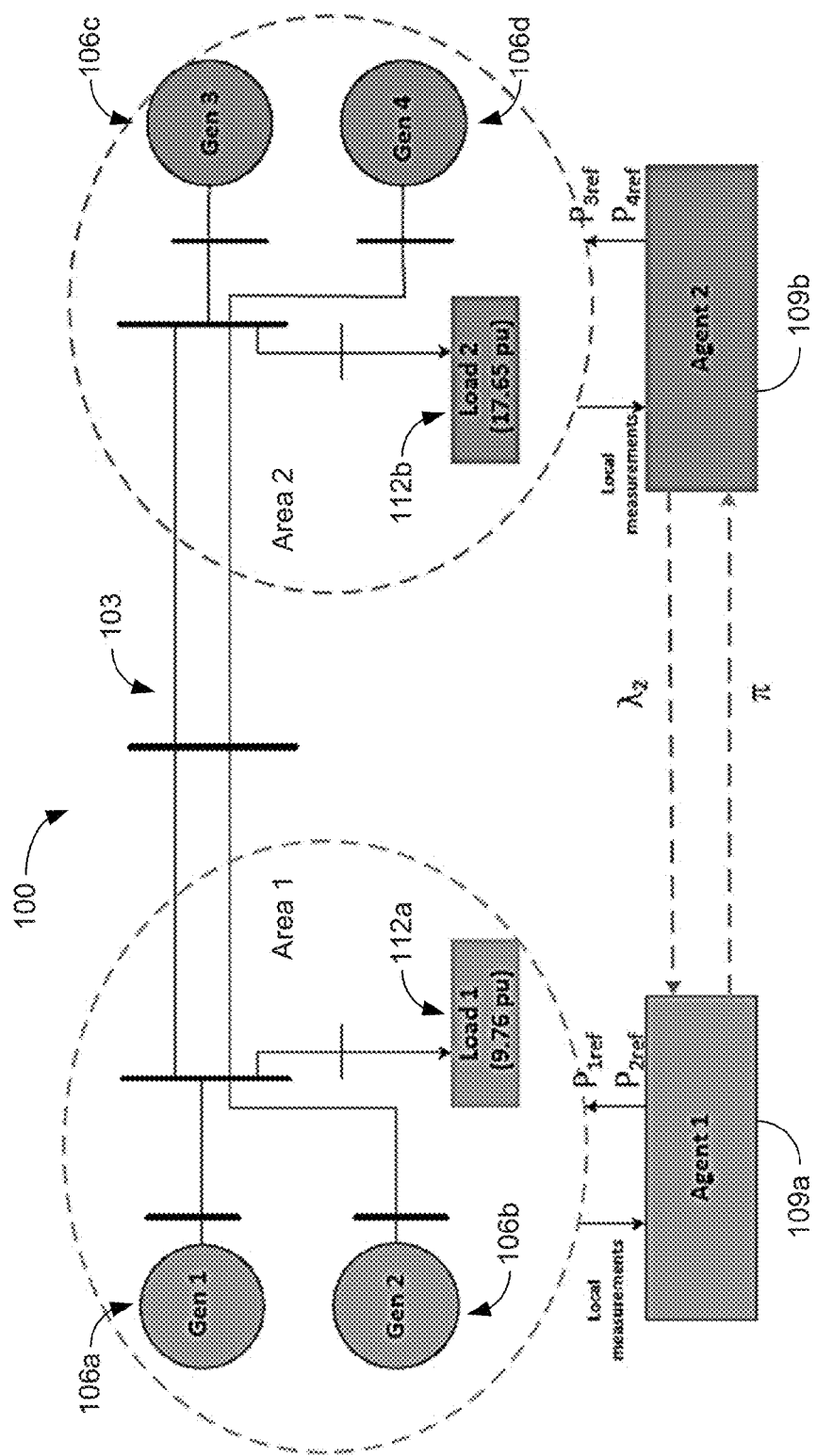
FIG. 1 is a schematic diagram illustrating an example of a power system, in accordance with various embodiments of the present disclosure.

Disclosed herein are various embodiments related to analysis of coupling dynamics for, e.g., power systems with iterative discrete decision making architectures. Multiple control agents may be used to handle the decision making process while exchanging limited information instead of one centralized control center. Reference will now be made in detail to the description of the embodiments as illustrated in the drawings, wherein like reference numbers indicate like parts throughout the several views.

Iterative "learning" by distributed control agents can be used for power system decision making. Such decision making can achieve agreement among control agents while preserving privacy. The iterative decision making process can interact with power system dynamics. In such cases, coupled dynamics are expected. In this disclosure, a modeling approach is presented that can conduct stability analysis for these hybrid systems. In the disclosed approach, the discrete decision making process is approximated by continuous dynamics. As a result, the entire hybrid system can be represented by a continuous dynamic system. Conventional stability analysis tools can then be used to check system stability and identify key impacting factors. An example power system with multiple control agents is used to demonstrate the proposed modeling and analysis. The analysis results are then validated by nonlinear time-domain simulation. The developed continuous dynamics models shed insights into the control nature of each distributed optimization algorithm. A consensus algorithm based decision making may act as an integrator of frequency deviation. It can bring the frequency back to nominal while the primal-dual based decision making cannot.

Various privacy-preserving decision making architectures for microgrids and power systems have been examined in the literature. The mathematical foundation of the privacy-preserving decision making is distributed optimization. For example, in dual decomposition, iterative updating of the Lagrangian variable translates in an iterative "learning" process among control agents. These iterative learning processes take place at a much faster speed than the traditional hourly economic dispatch process. In many cases, a feedback loop is introduced in the discrete decision making. For example, a frequency deviation signal can be fed into a price or power command update to reflect a power imbalance. The frequency deviation is the difference between measured frequency and the nominal frequency (e.g., 60 Hz). The relationship between a frequency deviation and a power or energy imbalance has been explored in the literature for new insights. For example, it has been indicated that primary frequency control with suitable droop parameters can be aligned with a distributed primal dual algorithm based optimization procedure. The integral secondary frequency control with proper gains can be aligned with a dual accent updating procure.

Therefore, it is reasonable to suggest that the dynamics of the decision making may be coupled with the power system dynamics. The coupled dynamics may affect the design of distributed optimization schemes. Without considering the power system dynamics, a dual accent update may indicate convergence with a step size. However, this update approach may prove to be unstable in the real-world due to power system dynamics. Analysis and testing of the design considering adequate power system dynamics is important to successful implementation. Until now, there has been little research that investigates dynamic stability for such hybrid systems. This disclosure provides a modeling approach to consider a hybrid system as a whole and conduct dynamic stability analysis.

A number of approaches have been documented in the literature to tackle dynamic analysis of hybrid systems. The first one is sampled data modeling approach. The discrete process is modeled in difference equation to describe the relation between a discrete decision variable at (k+1)-th step and that variable at k-th step. Between the discrete sampling period T, the continuous system dynamics is integrated for a period. That way, the continuous dynamics can be represented by difference equations as well. The entire system can be represented by a discrete process and its stability can be judged based on the discrete system. In power systems, discrete state-space models for thyristor series controlled capacitor have been developed using sampled data approach.

The second approach is to approximate the discrete process as continuous dynamics. This approach has been adopted to describe power market dynamics. More recently, this modeling approach has been adopted to model dynamics of power supply, power demand and energy storage and develop a pricing scheme.

Power system dynamics are nonlinear and complex. Integrating power system dynamics over a period is a daunting task. Therefore, the second approach is used to approximate the discrete decision making process. Compared to the first-order aggregated frequency dynamics that have been modeled, the power system dynamics modeled here are for multi-machine systems including electromechanical dynamics, turbine-governor control and primary frequency droop. The sophisticated modeling helps accurate prediction of stability (and instability). In addition, the validation platform is based on a nonlinear power system simulation platform Power System Toolbox with adequate details to represent power system dynamics.

This disclosure will describe the discrete decision making process and the representation by continuous dynamic, present the test system, power system dynamics and the continuous dynamic system representation of the entire hybrid system. Stability analysis will be conducted and validation results presented through time-domain simulation. This disclosure presents a straightforward modeling approach for hybrid system dynamic stability analysis. Development of analytical models is based on understanding of sophisticated multi-machine power system dynamics and distributed optimization procedures. The modeling approach help sheds insights into the hybrid system dynamics. Compared to other research work on coupled market and power system dynamics, this work includes not only analysis but also validation through time domain simulation for a power system with electromechanical dynamics, turbine-governor control and primary frequency control dynamics. The validation confirms the practical value of the disclosed modeling approach.

Decision Making Process and its Continuous Dynamic Model

Two types of iterative-based distributed decision making procedures and their corresponding dynamic models are discussed here. The first type is based on primal dual decomposition and the second type is based on consensus algorithm and subgradient update.

Type 1 Primal-Dual Decomposition Based Decision Making.

Consider a two-area power system economic dispatch problem where each area has a generator and a load.

$$\text{Prob}_1 \text{ minimize } f_1(P_1)+f_2(P_2) \tag{1a}$$

$$\text{subject to } \lambda_1 : P_1 - P_{12} = \overline{D}_1, \tag{1b}$$

$$\lambda_2 : P_2 + P_{12} = \overline{D}_2, \tag{1c}$$

$$-d \le P_{12} \le d, \tag{1d}$$

where $f_1(\cdot)$ and $f_2(\cdot)$ are the cost functions, $P_1$, $P_2$ are the power output from Gen 1 and Gen 2 and $P_{12}$ is the power from Area 1 to Area 2. $\overline{D}_1$ and $\overline{D}_2$ are the loads in Area 1 and Area 2, where d is assumed to be the line limit.

The partial Lagrangian function of $\text{Prob}_1$, without considering the limits of the tie-line, is given by:

$$L(P_1,P_2,P_{12},\lambda_1,\lambda_2)=f_1(P_1)+\lambda_1(\overline{D}_1-P_1+P_{12})+f_2(P_2)+\lambda_2(\overline{D}_2-P_2-P_{12}). \tag{2}$$

Given the two price signals $(\lambda_1,\lambda_2)$, can each area determine its generation $P_1$ and import $P_{12}$? This question will be examined by looking at Area 1. For a given $\lambda_1$, for this objective function $f_1(P_1)+(\overline{D}_1-P_1+P_{12})$, if $P_{12}$ has no limit imposed, there is no solution unless $\lambda_1=0$. The objective function can go $-\infty$. Therefore, this problem is considered not feasible.

Consider treating $P_{12}$ differently than $P_1$ and $P_2$ to help solve the problem. If $P_{12}$ is treated as given, similar as $\lambda_1$ and $\lambda_2$ are given, then the dual problem becomes:

$$d_1(\lambda_1, P_{12}) = \min_{P_1}\{f_1(P_1) + \lambda_1(\overline{D}_1 - P_1 + P_{12})\}, \tag{3}$$

$$d_2(\lambda_2, P_{12}) = \min_{P_2}\{f_2(P_2) + \lambda_2(\overline{D}_2 - P_2 + P_{12})\}. \tag{4}$$

The above two problems should have solutions.

Now consider the dual problem $\text{Prob}_2$ with $P_{12}$ given by:

$$\text{Prob}_2 \text{ maximize } d_1(\lambda_1,P_{12})+d_2(\lambda_2,P_{12}) \tag{5a}$$

$$\text{over } \lambda_1,\lambda_2. \tag{5b}$$

For this problem, the solution ends up dependent on $P_{12}$. Let this solution of $\text{Prob}_2$ be notated as a function of $P_{12}$:$g(P_{12})$. Thus, $g(P_{12})$ is a dual problem of the dual problem. Since the dual problem is a concave function over $\lambda_i$, the dual's dual problem should be a minimization problem over $P_{12}$.

Therefore, the dual's dual problem or the primal-dual problem $\text{Prob}_3$ can be written as follows:

$$\text{Prob}_3 \min_{P_{12}} \max_{\lambda_1}\left(\min_{P_1}\{f_1(P_1) - \lambda_1 P_1\} + \lambda_1(\overline{D}_1 + P_{12})\right) + \max_{\lambda_2}\left(\min_{P_2}\{f_2(P_2) - \lambda_2 P_2\} + \lambda_2(\overline{D}_2 + P_{12})\right). \tag{6}$$

A system that is connected by a tie-line can be decomposed by assuming a tie-line power flow. Each area will consider the tie-line flow injection or exporting as a negative (or positive) load. Each area carries out optimization and finds the locational marginal price (LMP) for the interfacing bus. The tie-line flow is then updated based on the price difference.

The dual's dual problem can be solved by subgradient updating of the primal variable $P_{12}$. Hereinafter, this virtual tie-line flow will be notated as a different name: $\pi$. The subgradient of the line flow is $(\lambda_1-\lambda_2)$. Since the primal problem is a minimization problem, in the update procedure, for a positive gradient, $\pi$ should be reduced. The updating procedure can be presented as follows:

$$\pi^{k+1}=\pi^k-\alpha(\lambda_1^k-\lambda_2^k), \tag{7}$$

where $\alpha>0$. For a given virtual tie-line flow $\pi^k$, the LMPs can be found by solving individual optimization problems for each area.

The decision making strategies utilize the assumption of lossless tie-lines. Therefore, the power dispatched by the generators only takes care of loads. The total generation is less than the total consumption including loads and tie-line power loss. To compensate for the frequency deviation ($\Delta f$), the strategies can be modified to have the price calculation include an additional component that can reflect the power unbalance or energy unbalance. The energy unbalance can be proportional to the system's average frequency deviation. Therefore, at each step, the LMPs computation becomes:

$$\lambda_1^k = 2a_1(D_1 + \pi^k) + b_1 - K\Delta f_1, \tag{8}$$

$$\lambda_2^k = 2a_2(D_2 - \pi^k) + b_2 - K\Delta f_2, \tag{9}$$

where $a_i$; $b_i$ are coefficients of a generator quadratic cost function $C_i(P_i) = a_i P_i^2 + b_i P_i + c_i$ and K is a gain.

If the system's frequency is below the nominal frequency, the prices will be increased. In turn, the generators will increase their dispatch.

Modeling as Continuous Dynamics:

Now, an approximate continuous model for the above mentioned iterative procedure can be given. Assuming that $\Delta f_1 = \Delta f_2$, the iteration of the virtual tie-line flow can be given by:

$$\pi^{k+1} = (1 - 2\alpha(a_1 + a_2))\pi^k + \pi_0, \tag{10}$$

where $\pi_0 = -\alpha(2a_1 D_1 - 2a_2 D_2 + b_1 - b_2)$.

The assumption that frequency everywhere is the same is true for steady-state. During transients, this statement is not true. However, discrete decision making takes several seconds for each step. For this interval, a power system may be able to reach steady state. Even if it has not achieved steady-state, frequencies represented by generator speeds agree with each other in general.

The power references can be determined by the prices. Therefore, $$P_1^k = (\pi^k + D_1) - \frac{K}{2a_1}\Delta f^k. \tag{11}$$

Considering that the frequency measurement of the previous step is taken in the price calculation, the k+1 step power reference can be modified as:

$$P_1^{k+1} = (\pi^{k+1} + D_1) - \frac{K}{2a_1}\Delta f^k. \tag{12}$$

Substituting $\pi^{k+1}$ and $\pi^k$ by $P_1^{k+1}$ and $P_1^k$, it can be found that:

$$P_1^{k+1} = [1 - 2\alpha(a_1 + a_2)]P^k - K\frac{\alpha(a_1 + a_2)}{a_1}\Delta f^k + P_{10}, \tag{13}$$

where $P_{10} = 2\alpha(a_1 + a_2)D_1$.

Using the forward Euler method, the derivative at k-step can be expressed as:

$$\dot{P}_1^k \approx \frac{P_1^{k+1} - P_1^k}{\tau}, \tag{14}$$

where $\tau$ is the step size. Therefore, the discrete equation can be approximated by a continuous dynamic equation, such as:

$$\tau \dot{P}_1 = -2\alpha(a_1 + a_2)P - K\frac{\alpha(a_1 + a_2)}{a_1}\Delta f + P_{10}. \tag{15}$$

To this end, the continuous dynamic model can be derived for the discrete decision making process. In the Laplace domain, the power command can be expressed as:

$$\Delta P_i^{ref} = \frac{K}{2a_i}\frac{1}{1 + \tau' s}\Delta f_i, \tag{16}$$

where $$\tau' = \frac{\tau}{2\alpha(a_1 + a_2)}.$$

Type 2 Consensus Algorithm and Subgradient Update Based Decision Making.

The second type of iterative based decision making is based on a consensus algorithm and subgradient update. A consensus problem can be identified from the original economic dispatch problem. For the following two-area system, the original economic dispatch problem can be expressed as follows:

$$\text{minimize } C_1(P_1) + C_2(P_2) \tag{17a}$$

$$\text{subject to:} P_1 + P_1 = D_1 + D_2 \tag{17b}$$

The dual problem can then be described by:

$$\max_{\lambda} \min_{P_1, P_2} C_1(P_1) + C_2(P_2) + \lambda(D_1 - P_1 + D_2 - P_2). \tag{18}$$

The above problem can be converted to a consensus problem by introducing price signals $\lambda_1$ and $\lambda_2$ for each area. Here, $\lambda_1$ should be equal to $\lambda_2$. Therefore, the optimization problem can be converted to a maximization problem with a consensus constraint.

The consensus algorithm that utilizes a stochastic matrix to conduct weighted averaging only guarantees consensus of multiple $\lambda$. It cannot guarantee that the $\lambda$ can maximize the dual problem's objective function. In order to guarantee maximization, a subgradient update is used. The subgradient of $\lambda$ is the total power unbalance, which is based on global information.

Fortunately in power systems, frequency deviation is a measure of power unbalance. Frequency is a local measurement. Therefore, distributed control can be realized by substituting the subgradient of $\lambda$ by the frequency deviation. The iterative procedure can be described by the following equations:

$$\begin{bmatrix} \lambda_1 \\ \lambda_2 \end{bmatrix}^{k+1} = A \begin{bmatrix} \lambda_1 \\ \lambda_2 \end{bmatrix}^k - K \begin{bmatrix} \Delta f_1 \\ \Delta f_2 \end{bmatrix}, \tag{19}$$

where A is a stochastic matrix and where K is the gain in the frequency deviation feedback. For the test two-area system, select $$A = \begin{bmatrix} 1/2 & 1/2 \\ 1/2 & 1/2 \end{bmatrix}.$$

The decision making again introduces feedback signals of frequencies. For each area, the power command is related to the Lagrangian multiplier. By ignoring the limits of each generator, it can be found that:

$$\lambda_1 = 2a_1 P_1 + b_1, \quad (20)$$

$$\lambda_2 = 2a_2 P_2 + b_2. \quad (21)$$

The iteration procedure of equation (19) can now be expressed in terms of the power commands:

$$\begin{bmatrix} P_1 \\ P_2 \end{bmatrix}^{k+1} + \begin{bmatrix} \frac{b_1}{2a_1} \\ \frac{b_2}{2a_2} \end{bmatrix} = A \left( \begin{bmatrix} P_1 \\ P_2 \end{bmatrix}^k + \begin{bmatrix} \frac{b_1}{2a_1} \\ \frac{b_2}{2a_2} \end{bmatrix} \right) - K \begin{bmatrix} \frac{\Delta f_1}{2a_1} \\ \frac{\Delta f_2}{2a_2} \end{bmatrix}. \quad (22)$$

The difference equation can now be converted to a continuous dynamic equation given by:

$$\begin{bmatrix} \Delta P_1 \\ \Delta P_2 \end{bmatrix} = \underbrace{-(\tau s - A + I)^{-1} \begin{bmatrix} \frac{K}{2a_1} & 0 \\ 0 & \frac{K}{2a_2} \end{bmatrix}}_{G_1(s)} \begin{bmatrix} \Delta f_1 \\ \Delta f_2 \end{bmatrix}. \quad (23)$$

The gain matrix $G_1(s)$ defines the transfer function matrix from the frequency deviation to the power commands as:

$$G_1(s) = \frac{K}{2\tau s(\tau s + 1)} \begin{bmatrix} \frac{2\tau s + 1}{2a_1} & \frac{1}{2a_2} \\ \frac{1}{2a_1} & \frac{2\tau s + 1}{2a_2} \end{bmatrix}. \quad (24)$$

Converting the discrete decision making process to continuous dynamics sheds light into each algorithm. Compared to the two dynamics of the decision making algorithms, the consensus algorithm includes an integrator unit. It is expected that consensus algorithm based Type-2 decision making can bring the frequency deviation to zero. The primal-dual algorithm is similar to a first-order filter. Therefore, it is not expected that the Type-1 decision making can bring the frequency back to nominal.

Test System and Power System Dynamic Model

Next, the power system dynamics model and the integrated system model will be described and analyzed. Referring to FIG. 1, shown is an example of a test power system comprising a two-area four-machine system 100. The two-area system of FIG. 1 illustrates the physical topology and the Type-1 information exchange architecture. This system comes from the classical two-area four machine power system with the following modifications: the tie-line 103 has been shortened; the inertia constants of the machines 106 have been reduced to 2.5 pu to provide faster electromechanical dynamics; and the damping coefficients have been set to 1 pu. The generators 106 are modeled as classical generators with turbine governor blocks. Primary frequency droops with the regulation constant at 4% are all included.

The underlying power system dynamic model $\Delta f/\Delta P_1^{ref}$ can be found. The two generators 106 in each area are coherent and therefore can be considered as one generator 106. The two-area four-machine system 100 may now be represented by a two-generator system. The two rotor angles can be expressed as:

$$\Delta \delta_1 = \frac{1}{M_1 s^2 + D_1 s + T_1}(\Delta P_{m1} + T_1 \Delta \delta_2), \quad (25)$$

$$\Delta \delta_2 = \frac{1}{M_2 s^2 + D_2 s + T_2}(\Delta P_{m2} + T_2 \Delta \delta_1), \quad (26)$$

where M, D, and T are inertia constants, damping and synchronizing coefficients, respectively. $T_1 = T_2$. Rearranging the equations, gives:

$$\Delta \delta_1 = \frac{(M_1 s^2 + D_1 s + T_1)\Delta P_{m1} + T_1 \Delta P_{m2}}{(M_1 s^2 + D_1 s + T_1)(M_1 s^2 + D_1 s + T_1) - T_1 T_2}. \quad (27)$$

Considering the turbine-governor control block $G_{tg}$, given by:

$$\begin{bmatrix} \Delta f_1 \\ \Delta f_2 \end{bmatrix} = G_2(s) \begin{bmatrix} \Delta P_1^{ref} \\ \Delta P_2^{ref} \end{bmatrix}, \quad (28)$$

the transfer function matrix $G_2(s)$ that defines the relationship from the power command to the speed deviations due to the power system dynamics is expressed as:

$$G_2(s) = \frac{G_{tg}(s) s}{\omega_0[(M_1 s^2 + D_1 s + T_1)(M_2 s^2 + D_2 s + T_2) - T_1 T_2]}[M_{G_2}], \quad (29)$$

where $$[M_{G_2}] = \begin{bmatrix} M_1 s^2 + D_1 s + T_1 & T_1 \\ T_2 & M_2 s^2 + D_2 s + T_2 \end{bmatrix}.$$

Figure 2:
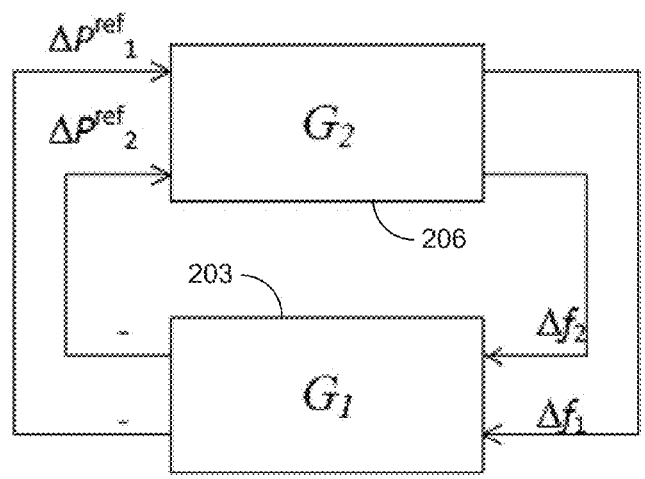
FIG. 2 is a block diagram illustrating an example of a generator control including discrete decision making dynamics $G_1$ and power system dynamics $G_2$, in accordance with various embodiments of the present disclosure.

In addition, the droop control can be included. Therefore, the diagonal components of $G_2(s)$ have been modified to include the droop control. Referring to FIG. 2, shown is a block diagram illustrating an example of the entire system, where $G_1$ 203 represents the discrete decision making dynamics while $G_2$ 206 represents the power system dynamics.

Figure 3A:
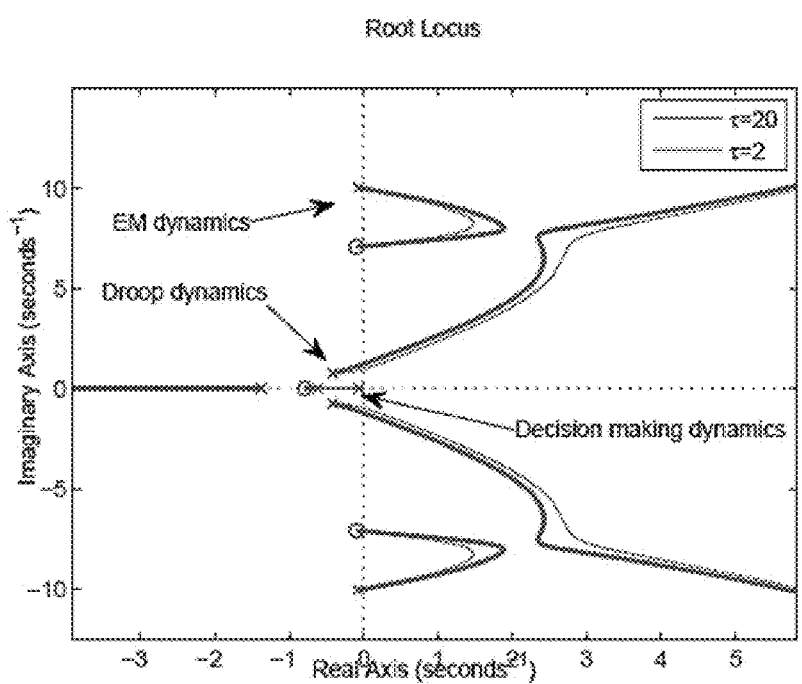
FIGS. 3A-3B and 4A-4B illustrate examples of root loci plots of Type 1 and Type 2 systems, respectively, in accordance with various embodiments of the present disclosure.
Figure 3B:
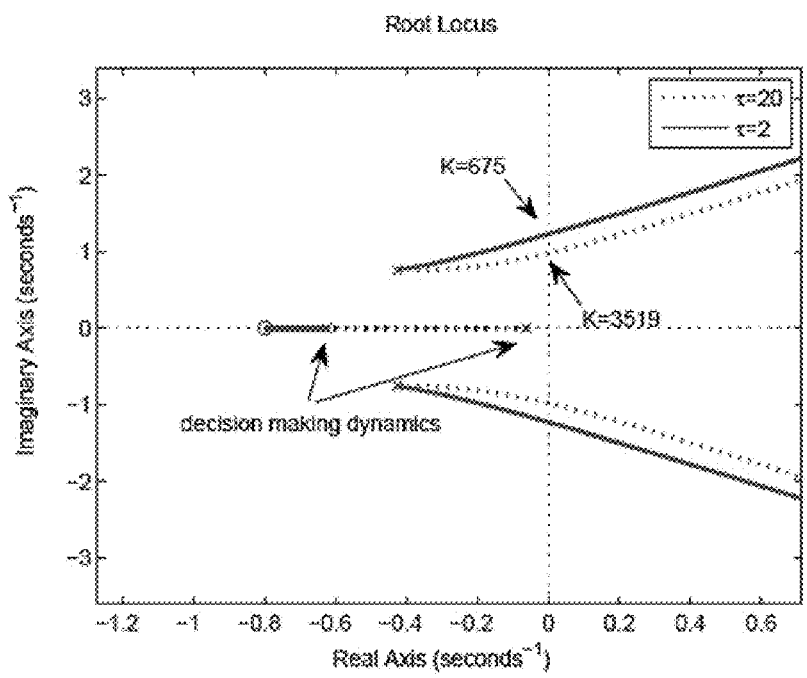
Figure 4A:
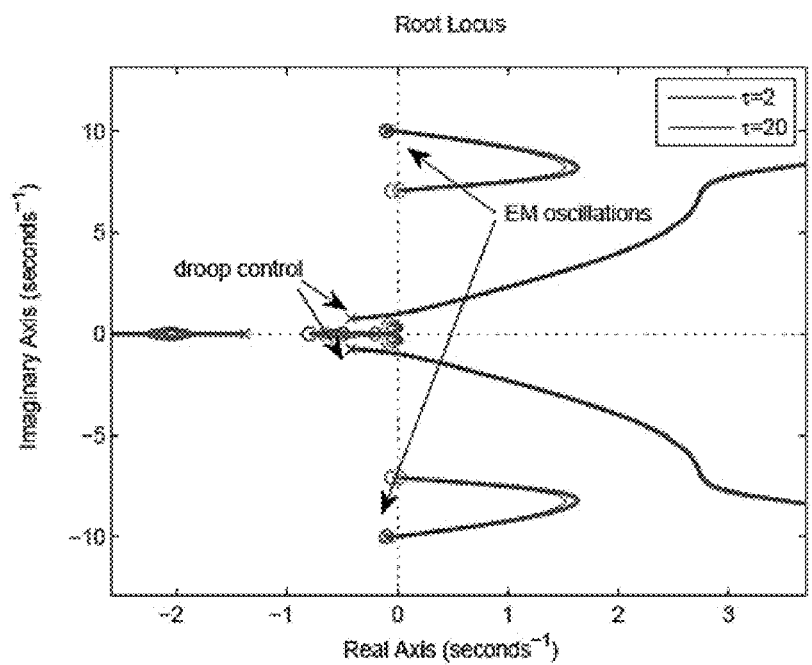
Figure 4B:
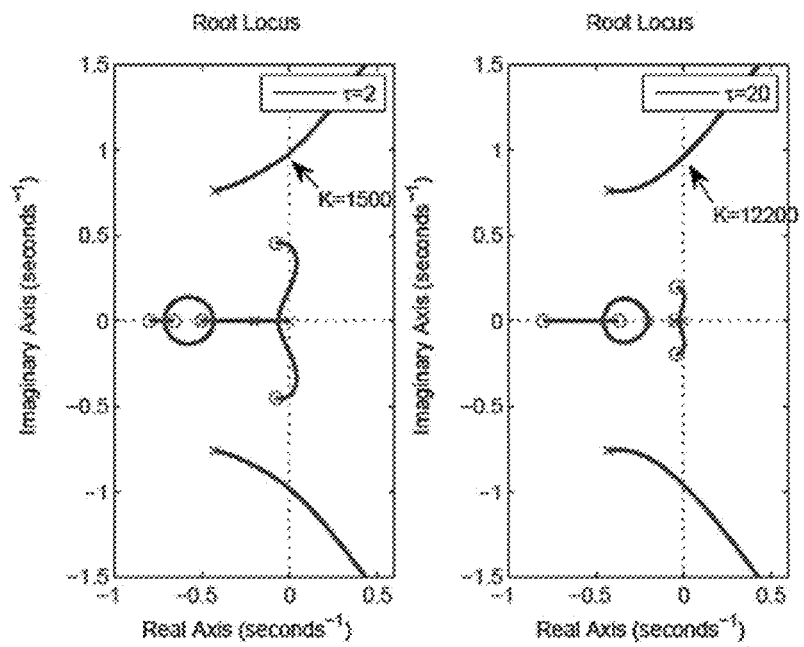

Root Loci:

To examine the stability of the closed-loop system, the open-loop gain matrix $G_2 G_1$ will be examined. $G_2 G_1$ is a two by two matrix. The root loci of the first row first column element are shown in FIGS. 3A-3B and 4A-4B. FIGS. 3A and 3B (an enlarged view of FIG. 3A) illustrate the root loci for the Type 1 system with two step sizes $\tau=2$ and $\tau=20$. It can be shown that the droop related poles will move to the right-half-plane (RHP) when the gain K is increasing. The system can be made more stable by increasing the step size $\tau$. FIGS. 4A and 4B (enlarged views of FIG. 4A) illustrate the root loci for the Type 2 system with two step sizes $\tau=2$ and $\tau=20$. It can be shown that droop related poles will go to the right-half-plane (RHP) when the gain K is increasing.

Again, the system can be made more stable by increasing the step size τ. The analysis shows that the hybrid system could suffer low frequency oscillations of approximately 0.1-0.2 Hz. Increasing the gain of the frequency deviation in the discrete decision making steps will make the system go unstable.

Dynamic Simulation Results

Next, dynamic simulation results are presented to validate the system operation. The two types of discrete decision making procedures were implemented using the two-area four-machine power system 100 shown in FIG. 1 and Power System Toolbox was selected as the dynamic simulation platform.

The power system and Type 1 decision making architecture are shown in FIG. 1. The discrete decision making can take place at a predefined interval, e.g., every 2 seconds or every 5 seconds. The power commands from Agent 1 (109a) and Agent 2 (109b) will be sent to change the turbine-governors' power reference inputs of the generator controller(s). Among the two agents 109, the information exchanged includes the virtual tie-line power flow ($\pi$) and the price signal ($\lambda_2$). Area 1 comprises Gen 1 (106a) and Gen 2 (106b) and Load 1 (112a). Area 2 comprises Gen 3 (106c), Gen 4 (106d) and Load 2 (112b). The two areas are connected through tie-lines 103.

Initially, the four generators 106a-106d are dispatched at 7.0207 pu, 7.00 pu, 7.16 pu and 7.00 pu, respectively. Assume that in Area 1 the two generators 106a and 106b have the same quadratic cost functions: $1.5P_1^2$ and $1.5P_2^2$ and in Area 2 the two generators 106c and 106d also have the same quadratic cost functions $P_3^2$ and $P_4^2$. In the example of FIG. 1, the total load of the two areas is 27.41 pu. Initially, the dispatch levels of the four generators 106 are similar. After the decision making procedures, the Area 2 generators will have higher dispatch levels as Gen 3 (106c) and Gen 4 (106d) are much cheaper than Gen 1 (106a) and Gen 2 (106b).

Type 1 Primal-Dual Based Decision Making.

Three scenarios were compared to show the effect of the step size τ (sec) of the discrete decision making and the gain K in frequency deviation feedback.

Scenario 1: τ=2 and K=300.
Scenario 2: τ=2 and K=500.
Scenario 3: τ=5 and K=500.

Figure 5A:
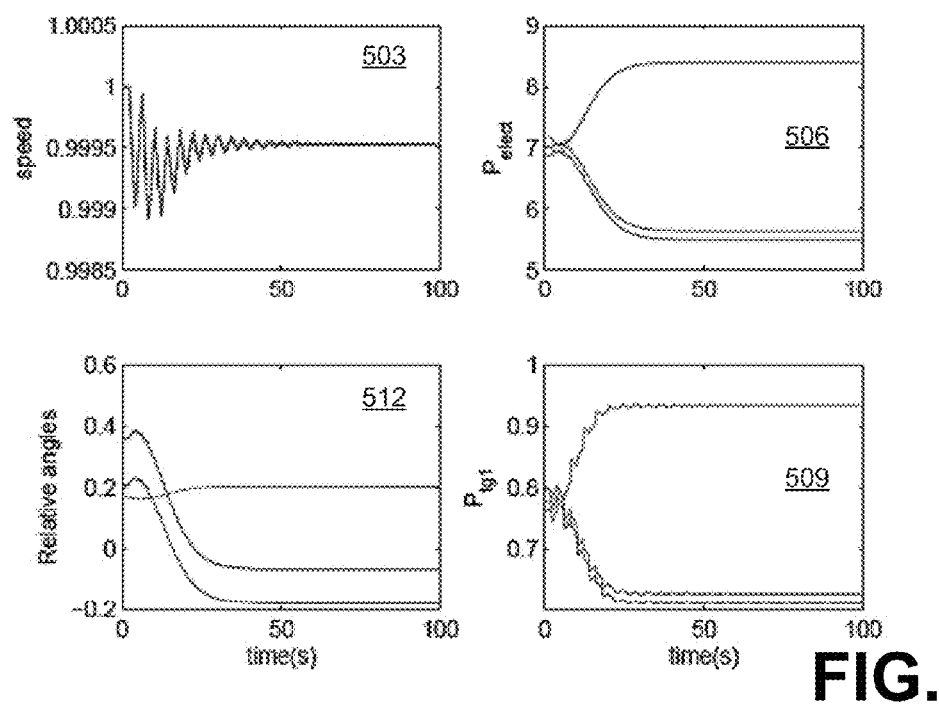
FIGS. 5A-5B, 6A-6B and 7 illustrate examples of system dynamic responses for Type 1 consensus decision making for the power system of FIG. 1, in accordance with various embodiments of the present disclosure.
Figure 5B:
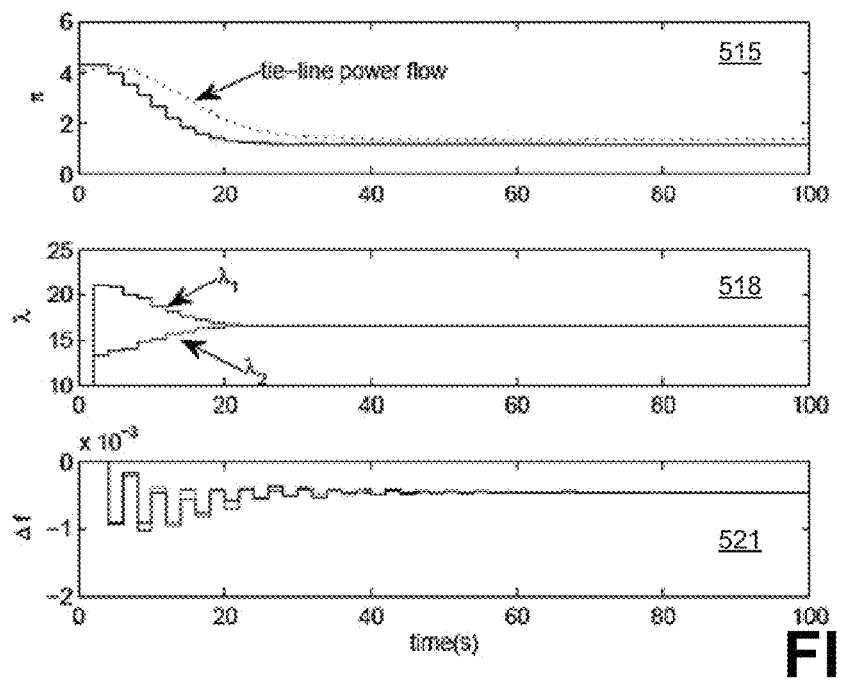

FIG. 5A illustrates the system dynamic responses for Scenario 1 with Type 1 consensus decision making, where plot 503 shows the generator speeds in pu, plot 506 shows the generator power based on a system power base of 100 MW, plot 509 shows the turbine governor unit power based on the machine power base of 900 MW, and plot 512 shows the angles of Gens 1-3 (160a-106c of FIG. 1) relative to Gen 4 (106d of FIG. 1) in radians. FIG. 5B illustrates changes in the Lagrangian multipliers over time, where plot 515 shows the virtual tie-line power flow ($\pi$), plot 518 shows the price signals ($\lambda_1, \lambda_2$), and plot 521 shows the frequency deviations ($\Delta f$).

Figure 6A:
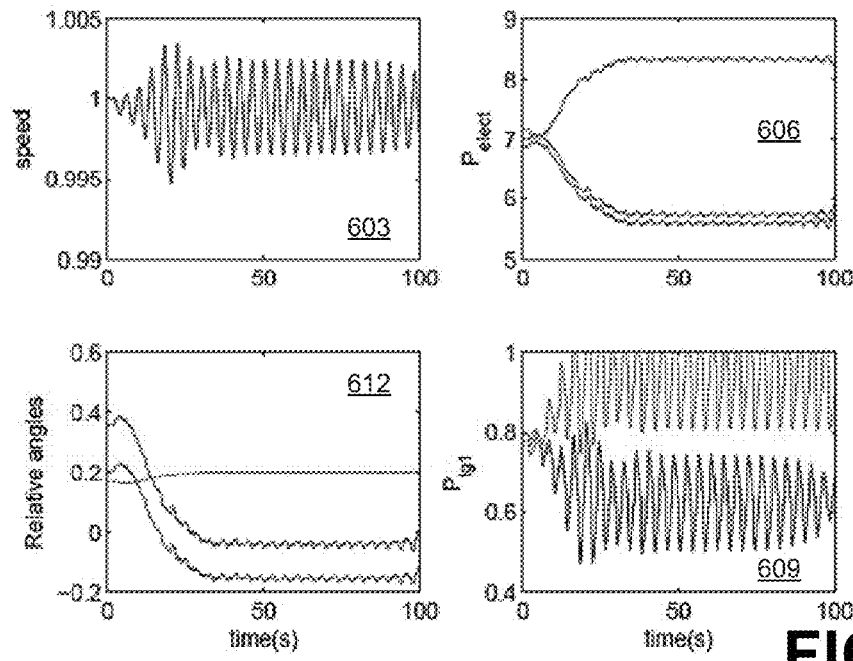
Figure 6B:
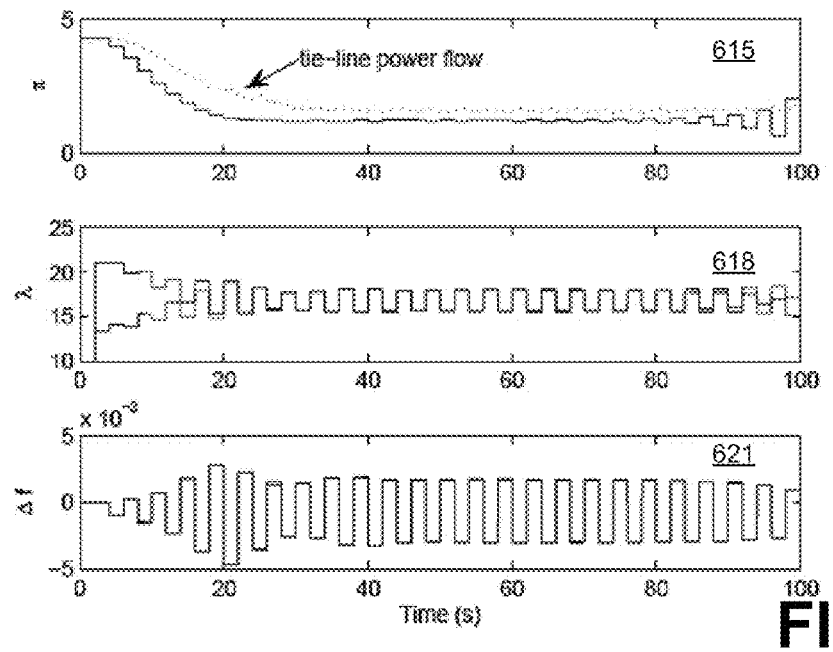

FIG. 6A illustrates the system dynamic responses for Scenario 2 with Type 1 consensus decision making, where plot 603 shows the generator speeds in pu, plot 606 shows the generator power based on a system power base of 100 MW, plot 609 shows the turbine governor unit power based on the machine power base of 900 MW, and plot 612 shows the angles of Gens 1-3 (160a-106c of FIG. 1) relative to Gen 4 (106d of FIG. 1) in radians. FIG. 6B illustrates changes in the Lagrangian multipliers over time, where plot 615 shows the virtual tie-line power flow ($\pi$), plot 618 shows the price signals ($\lambda_1, \lambda_2$), and plot 621 shows the frequency deviations ($\Delta f$).

Figure 7:
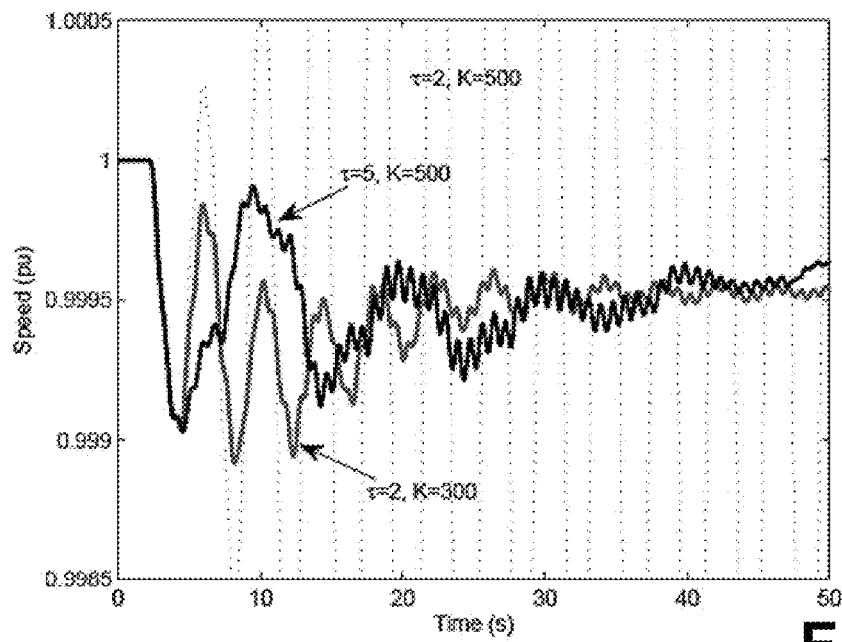

Oscillations at 0.2 Hz were observed in Scenario 2 when the gain was increased to K=500. In Scenario 3, the step size z was increased to 5 seconds for the gain K of 500. The oscillations are then damped. The machine speeds for Gen 1 (106a of FIG. 1) for the three scenarios with Type 1 consensus decision making are compared in FIG. 7. The simulation results corroborate the findings made in the root locus analysis. The slower the discrete decision making process, the more stable the system becomes.

Type 2 Consensus Based Decision Making.

Two scenarios were compared to show the effect of the step size τ (sec) of discrete decision making and the gain K in frequency deviation feedback.

Scenario 1: τ=2 and K=500.
Scenario 2: τ=5 and K=500.

Figure 8A:
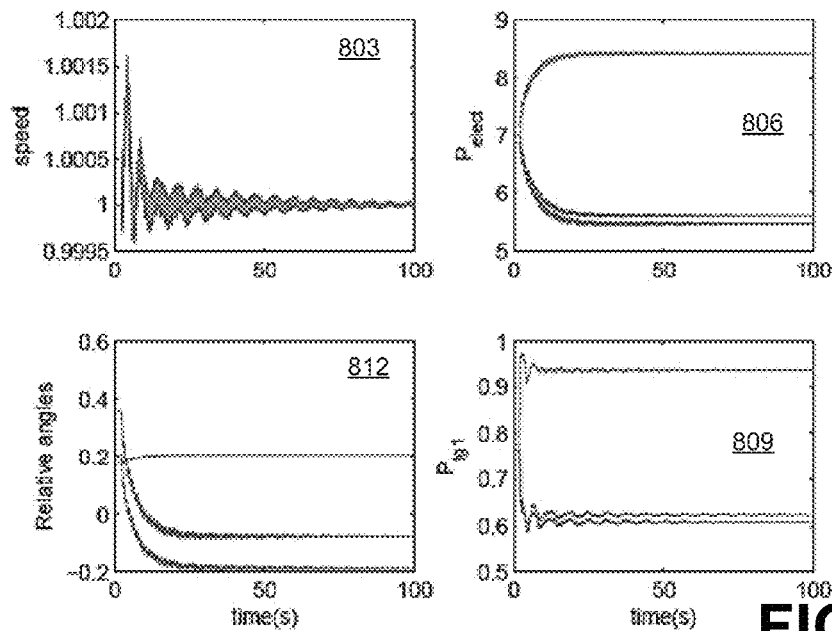
FIGS. 8A-8B, 9A-9B and 10 illustrate examples of system dynamic responses for Type 2 consensus decision making for the power system of FIG. 1, in accordance with various embodiments of the present disclosure.
Figure 8B:
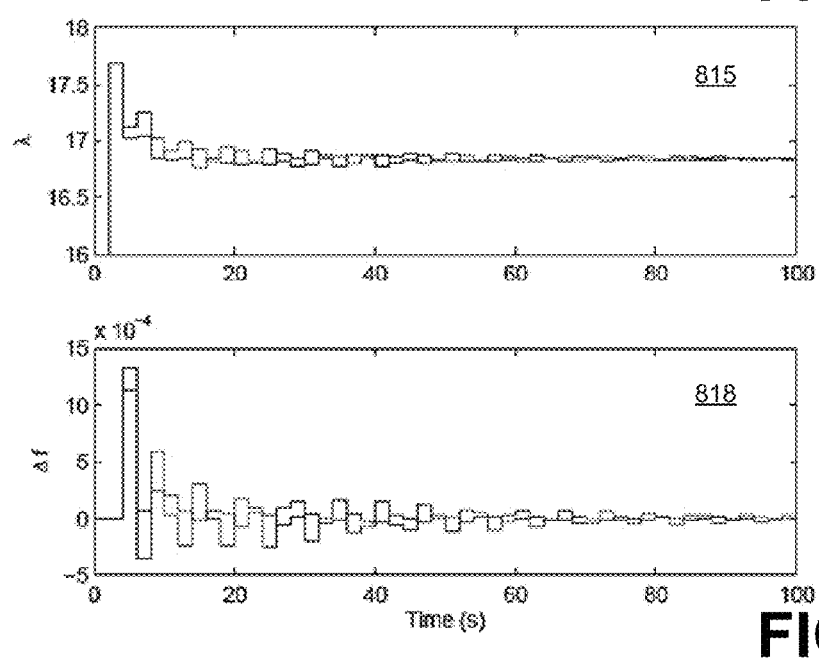

FIG. 8A illustrates the system dynamic responses for Scenario 1 with Type 2 consensus decision making, where plot 803 shows the generator speeds in pu, plot 806 shows the generator power based on a system power base of 100 MW, plot 809 shows the turbine governor unit power based on the machine power base of 900 MW, and plot 812 shows the angles of Gens 1-3 (160a-106c of FIG. 1) relative to Gen 4 (106d of FIG. 1) in radians. FIG. 8B illustrates changes in the Lagrangian multipliers over time, where plot 815 shows the price signals ($\lambda_1, \lambda_2$), and plot 818 shows the frequency deviations ($\Delta f$).

Figure 9A:
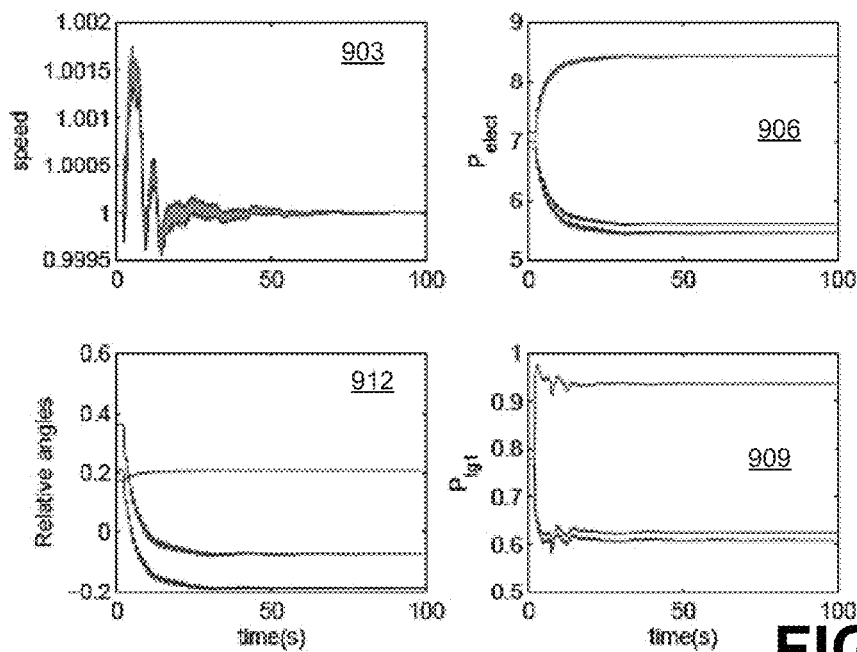
Figure 9B:
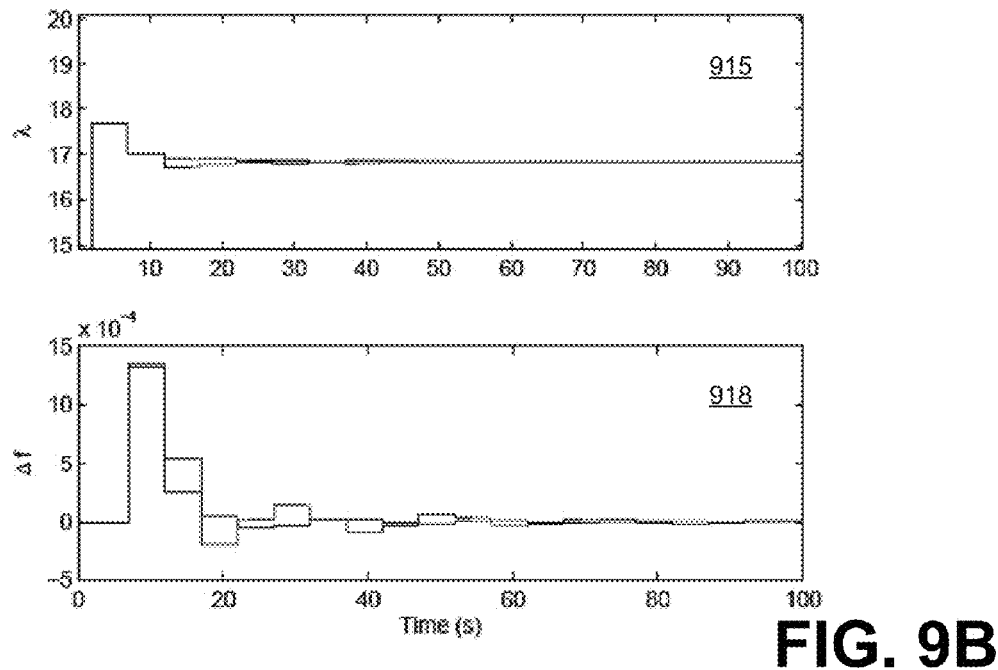

FIG. 9A illustrates the system dynamic responses for Scenario 2 with Type 2 consensus decision making, where plot 903 shows the generator speeds in pu, plot 906 shows the generator power based on a system power base of 100 MW, plot 909 shows the turbine governor unit power based on the machine power base of 900 MW, and plot 912 shows the angles of Gens 1-3 (160a-106c of FIG. 1) relative to Gen 4 (106d of FIG. 1) in radians. FIG. 9B illustrates changes in the Lagrangian multipliers over time, where plot 915 shows the price signals ($\lambda_1, \lambda_2$), and plot 918 shows the frequency deviations ($\Delta f$).

Figure 10:
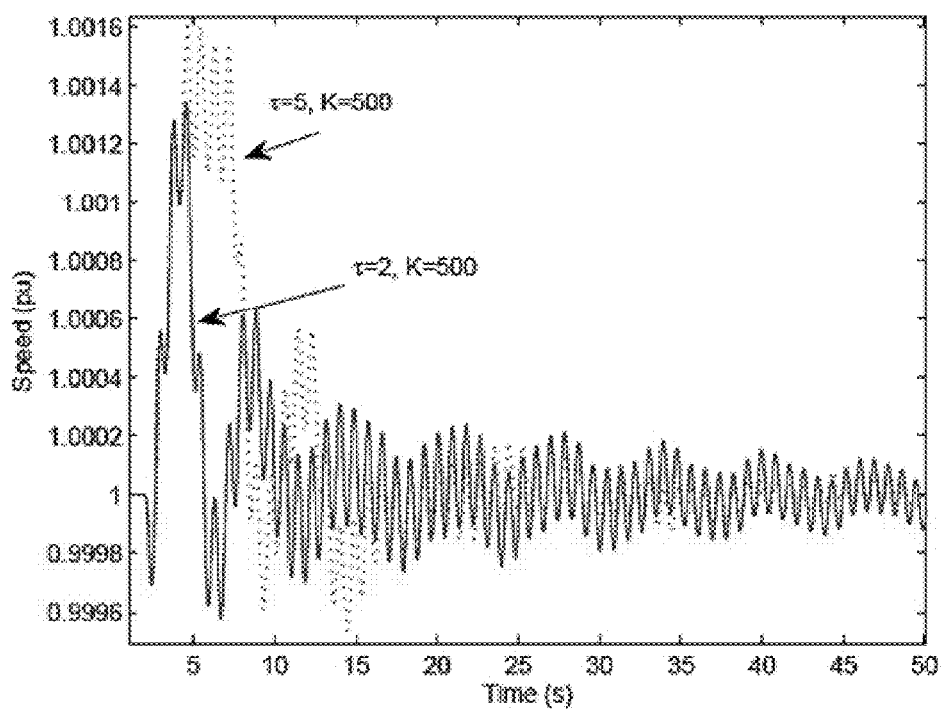

The comparison of the two scenarios is presented in FIG. 10. It can be observed in FIG. 10 that when τ=2 seconds, 0.15 Hz oscillations were observed. When the step size was increased to 5 seconds, the oscillations exhibited better damping. The dynamic simulation results corroborated the findings made through linear system analysis above. The slower the discrete decision making, more stable the system becomes.

Comparing the frequency response of Type-1 and Type-2 architectures, we also confirm this important finding: the particular consensus algorithm works as a secondary frequency control with economic dispatch. Type-2 decision making process can bring frequency back to the nominal frequency.

In this disclosure, continuous dynamic models for iterative decision making processes are presented. The models were used together with a power system dynamic model to determine the hybrid system dynamic stability. Such stability issues cannot be identified when one of the dynamics is not considered. The continuous dynamic model derivation step and linear analysis of the integrated power system and decision making system was demonstrated. The analysis identified the stability issue for these types of hybrid systems. The closed-loop system poles due to turbine governor, primary frequency control and the decision making dynamics will move to the right half plane when the frequency deviation gain is increased. A slower decision making process leads to a more stable system. Time-domain simulation in PST was been conducted for validation.

Figure 11:
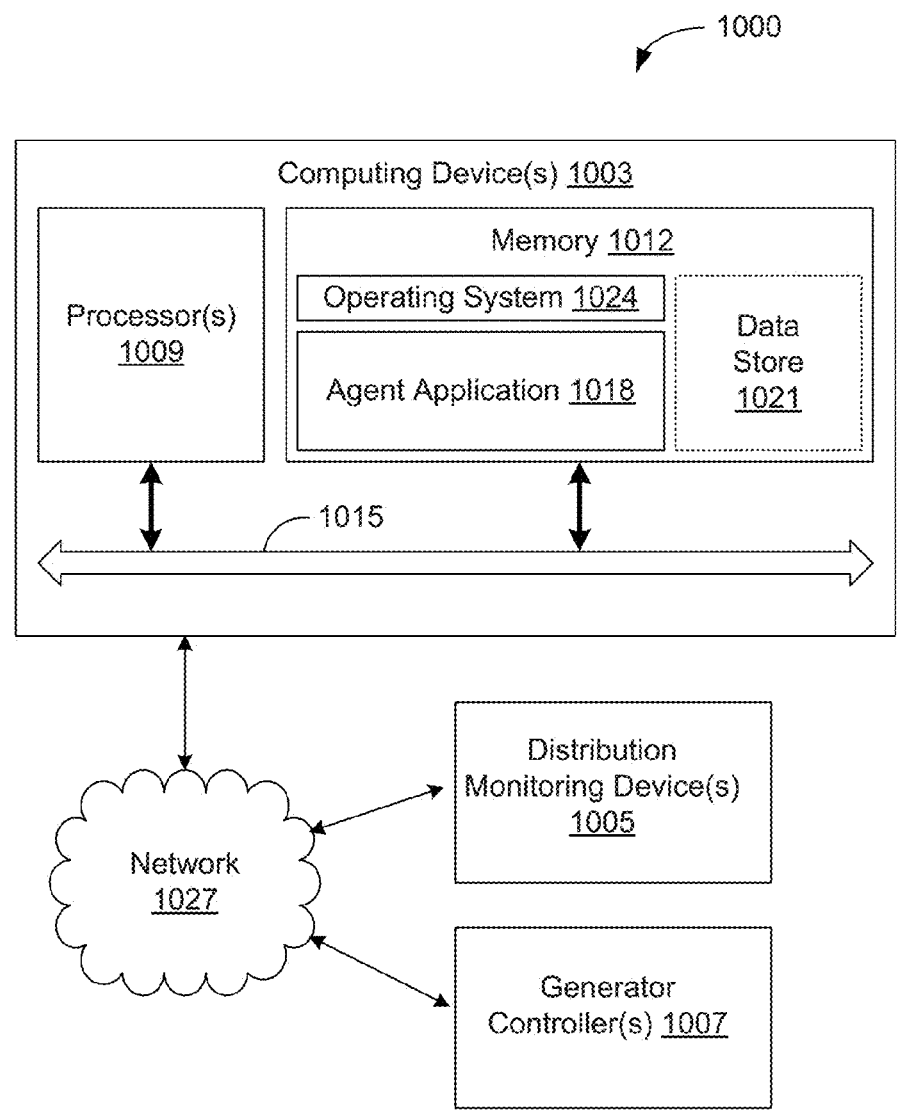
FIG. 11 is an example of a system that may be utilized in power distribution analysis and control according to various embodiments of the present disclosure.

Referring now to FIG. 11, shown is an example of a system 1000 that may be utilized as an agent 109 (FIG. 1) in the monitoring and control of power systems. The system 1000 includes one or more computing device(s) 1003, one or more distribution monitoring device(s) 1005 that can be distributed about a power distribution network to provide indications of operational conditions in the power distribution network, and one or more generator controller(s) 1007 such as a turbine-governor control for the generators 106 of FIG. 1. For example, the distribution monitoring device(s) 1005 can monitor electrical power distribution and operation by monitoring conditions of components of the distribution network such as generators and/or distribution buses. Monitored conditions can include voltage levels, current flows, frequencies, operating speeds, and/or other conditions of the various system components. The generator controller(s) 1007 can control the operation of the corresponding generator(s) 106 (FIG. 1) based upon signals received from the computing device 1003. While not shown in FIG. 11, the computing device 1003 can include communication interfaces allowing the computing device 1003 to communicate with another computing device 1003, either directly or through a network, to facilitate agent-to-agent communications.

The computing device 1003 includes at least one processor circuit, for example, having a processor 1009 and a memory 1012, both of which are coupled to a local interface 1015. To this end, the computing device(s) 1003 may comprise, for example, a server computer or any other system providing computing capability. The computing device(s) 1003 may include, for example, one or more display devices such as cathode ray tubes (CRTs), liquid crystal display (LCD) screens, gas plasma-based flat panel displays, LCD projectors, or other types of display devices, etc. The computing device(s) 1003 may also include, for example various peripheral devices. In particular, the peripheral devices may include input devices such as, for example, a keyboard, keypad, touch pad, touch screen, microphone, scanner, mouse, joystick, or one or more push buttons, etc. Even though the computing device 1003 is referred to in the singular, it is understood that a plurality of computing devices 1003 may be employed in the various arrangements as described above. The local interface 1015 may comprise, for example, a data bus with an accompanying address/control bus or other bus structure as can be appreciated.

Stored in the memory 1012 are both data and several components that are executable by the processor 1009. In particular, stored in the memory 1012 and executable by the processor 1009 include an agent application 1018 and potentially other applications. Also stored in the memory 1012 may be a data store 1021 and other data. The data stored in the data store 1021, for example, is associated with the operation of the various applications and/or functional entities described below. For example, the data store may include sample analysis results, corrective measures, and other data or information as can be understood. In addition, an operating system 1024 may be stored in the memory 1012 and executable by the processor 1009. The data store 1021 may be may be located in a single computing device or may be dispersed among many different devices.

The distribution monitoring device 1005 is representative of a plurality of devices that may be communicatively coupled to the computing device 1003 through a network 1027 such as, e.g., the Internet, intranets, extranets, wide area networks (WANs), local area networks (LANs), wired networks, wireless networks, networks configured for communication over a power grid, or other suitable networks, etc., or any combination of two or more such networks. The distribution monitoring device 1005 may comprise, for example, a processor-based system such as a computer system or other application specific monitoring system with communication capabilities. In some embodiments, a distribution monitoring device 1005 may be directly connected to the computing device 1003.

The components executed on the computing device 1003 include, for example, the agent application 1018 and other systems, applications, services, processes, engines, or functionality not discussed in detail herein. The computing device 1003 can receive information regarding the monitored component from a distribution monitoring device 1005, which can then be evaluated by the agent application 1018. The computing device 1003 may also receive stored information regarding a power distribution network for modeling and evaluation of the network.

It is understood that there may be other applications that are stored in the memory 1012 and are executable by the processor 1009 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1012 and are executable by the processor 1009. In this respect, the term "executable" means a program file that is in a form that can ultimately be run by the processor 1009. Examples of executable programs may be, for example, a compiled program that can be translated into machine instructions in a format that can be loaded into a random access portion of the memory 1012 and run by the processor 1009, source code that may be expressed in proper format such as object code that is capable of being loaded into a random access portion of the memory 1012 and executed by the processor 1009, or source code that may be interpreted by another executable program to generate instructions in a random access portion of the memory 1012 to be executed by the processor 1009, etc. An executable program may be stored in any portion or component of the memory 1012 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 1009 may represent multiple processors 1009 and the memory 1012 may represent multiple memories 1012 that operate in parallel processing circuits, respectively. In such a case, the local interface 1015 may be an appropriate network that facilitates communication between any two of the multiple processors 1009, between any processor 1009 and any of the memories 1012, or between any two of the memories 1012, etc. The local interface 1015 may comprise additional systems designed to coordinate this communication, including, for example, performing load balancing. The processor 1009 may be of electrical or of some other available construction.

Although the agent application 1018, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the ED/FR feedback control application 1018, that comprises software or instructions can be embodied in any non-transitory computer-readable medium for use by or in connection with an instruction execution system such as, for example, a processor 1009 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
obtaining, by a first area control agent of a first area of a power system, a frequency difference associated with a generator of the first area of the power system, where the first area control agent controls power generation by generators of the first area of the power system;
determining, by the first area control agent, an output power adjustment for the generator of the first area, the output power adjustment based at least in part upon the frequency difference associated with the generator, a first area price signal corresponding to the power generation by the generators of the first area of the power system, and a second area price signal corresponding to power generation by generators of a second area of the power system, where the second area is coupled to the first area by a tie-line and a second area control agent controls the power generation by the generators of the second area of the power system; and
providing, by the first area control agent, a power command to a control system of the generator, the power command based upon the output power adjustment for the generator.

2. The method of claim 1, wherein the second area price signal is received from the second area control agent.

3. The method of claim 2, comprising providing, by the first area control agent, a virtual tie-line power flow to the second area control agent.

4. The method of claim 1, wherein a plurality of output power adjustments comprising the output power adjustment for the generator are determined based at least in part upon a plurality of frequency differences including the frequency difference associated with the generator, the first area price signal corresponding to the power generation by the generators of the first area, and the second area price signal corresponding to the power generation by the generators of the second area, wherein each of the plurality of output power adjustments corresponds to a different one of the generators of the first area of the power system.

5. The method of claim 4, comprising providing a second power command to a control system of a second generator of the generators of the first area of the power system, the second power command based upon a second output power adjustment of the plurality of output power adjustments.

6. The method of claim 1, wherein the first area price signal corresponding to the power generation by the generators of the first area of the power system is based upon a cost function of the generator of the first area.

7. The method of claim 1, wherein the frequency difference is associated with a plurality of coherent generators of the first area of the power system.

8. The method of claim 7, wherein the power command is provided to control systems of the plurality of coherent generators.

9. The method of claim 1, wherein the power command is a power reference signal.

10. The method of claim 1, wherein the output power adjustment for the generator is determined at a defined time interval.

11. The method of claim 10, comprising damping speed oscillations of the generator by increasing the defined time interval.

12. A power system control system, comprising:
a first area control agent configured to control power generation by generators of a first area of a power system, the first area coupled to a second area of the power system by a tie-line; and a second area control agent in communication with the first area control agent, the second area control agent configured to control power generation by generators of the second area of the power system based at least in part upon frequency differences of the generators of the second area, a first area price signal corresponding to power generation in the first area, and a second area price signal corresponding to power generation in the second area of the power system.

13. The power system control system of claim 12, wherein the first area price signal is received by the second area control agent from the first area control agent.

14. The power system control system of claim 13, wherein the first area control agent also provides a virtual tie-line power flow to the second area control agent.

15. The power system control system of claim 12, wherein the second area control agent is configured to:

determine at least one output power adjustment based at least in part upon the frequency differences of the generators of the second area and the first area and second area price signals, each of the at least one output power adjustment corresponding to one of the generators of the second area; and provide a power command to a control system of at least one generator of the generators of the second area of the power system, the power command based upon the at least one output power adjustment corresponding to the at least one generator.

16. The power system control system of claim 15, wherein the power command is provided to control systems of a plurality of generators of the second area of the power system.

17. The power system control system of claim 15, wherein the second area price signal corresponding to the power generation in the second area of the power system is based upon a cost function of the at least one generator.

18. The power system control system of claim 15, wherein the at least one output power adjustment is determined at a defined time interval.

19. The power system control system of claim 18, wherein the second area control agent is configured to damp speed oscillations of the at least one generator by increasing the defined time interval.

20. The power system control system of claim 12, wherein the generators of the second area are a plurality of coherent generators.

* * * * *